(12) United States Patent
Lee et al.

(10) Patent No.: US 11,383,582 B2
(45) Date of Patent: Jul. 12, 2022

(54) HEAT PUMP SYSTEM FOR VEHICLE

(71) Applicants: Hyundai Motor Company, Seoul (KR); Kia Motors Corporation, Seoul (KR); Doowon Climate Control Co., Ltd., Asan-si (KR)

(72) Inventors: Kilwoo Lee, Yongin-si (KR); Dong Seok Oh, Hwaseong-si (KR); Yong Hyun Choi, Hwaseong-si (KR); Won Suk Lee, Cheonan-si (KR); Soon-Jong Lee, Yesan-eup (KR); Chui Min Kim, Asan-si (KR)

(73) Assignees: Hyundai Motor Company, Seoul (KR); Kia Motors Corporation, Seoul (KR); Doowon Climate Control Co., Ltd., Asan-si (KR)

( * ) Notice: Subject to any disclaimer, the term of this patent is extended or adjusted under 35 U.S.C. 154(b) by 172 days.

(21) Appl. No.: 16/890,321

(22) Filed: Jun. 2, 2020

(65) Prior Publication Data

US 2021/0146753 A1    May 20, 2021

(30) Foreign Application Priority Data

Nov. 15, 2019 (KR) .................. 10-2019-0146515

(51) Int. Cl.
*B60H 1/32* (2006.01)
*B60H 1/00* (2006.01)

(52) U.S. Cl.
CPC ..... *B60H 1/00921* (2013.01); *B60H 1/00485* (2013.01); *B60H 1/3213* (2013.01)

(58) Field of Classification Search
CPC ...... B60H 2001/00935; B60H 1/00921; B60H 1/00485; B60H 1/3213; B60H 1/00278
See application file for complete search history.

(56) References Cited

U.S. PATENT DOCUMENTS 3,556,144 A * 1/1971 Bickers ............... F15B 13/0405
                                                      137/596.15
5,878,589 A * 3/1999 Tanaka ............... B60H 1/00007
                                                      62/199

(Continued)

FOREIGN PATENT DOCUMENTS

KR    20130029870 A    3/2013
KR    20160009779 A    1/2016

(Continued)

*Primary Examiner* — Nelson J Nieves
(74) *Attorney, Agent, or Firm* — Slater Matsil, LLP

(57) ABSTRACT

A heat pump system for a vehicle includes an integrated control valve, an external condenser connected to the integrated control valve through first and second connection lines, an expansion valve connected to the integrated control valve through a third connection line, an evaporator connected to the expansion valve, an accumulator connected to the evaporator, a compressor connected to the accumulator, an internal condenser connected to the compressor and connected to the integrated control valve through a fourth connection line, a first chiller disposed on a fifth connection line connecting the integrated control valve and the accumulator, a sixth connection line connecting the fifth connection line and the integrated control valve between the first chiller and the accumulator, and a second chiller provided on a seventh connection line connecting a refrigerant line and the integrated control valve between the evaporator and the accumulator.

20 Claims, 5 Drawing Sheets

(56) References Cited

U.S. PATENT DOCUMENTS

| | | | | |
|---|---|---|---|---|
| 5,996,369 | A * | 12/1999 | Hirota | B60H 1/00878 62/324.6 |
| 7,841,363 | B1 * | 11/2010 | Suharno | F15B 13/0817 137/884 |
| 2004/0003612 | A1 * | 1/2004 | Ghodbane | B60H 1/00485 62/197 |
| 2007/0113575 | A1 * | 5/2007 | Borre | F16K 11/0873 62/292 |
| 2014/0041826 | A1 * | 2/2014 | Takeuchi | B60H 1/00899 165/10 |
| 2015/0217627 | A1 * | 8/2015 | Kang | F25B 6/04 62/324.6 |
| 2016/0238327 | A1 * | 8/2016 | Lotha | F28F 13/06 |
| 2018/0117985 | A1 * | 5/2018 | Kim | B60H 1/00921 |
| 2018/0222289 | A1 * | 8/2018 | Kawakubo | B60H 1/00485 |
| 2019/0135075 | A1 * | 5/2019 | Hwang | F25B 41/40 |
| 2019/0152294 | A1 * | 5/2019 | Peng | F25B 6/04 |
| 2019/0241044 | A1 * | 8/2019 | Ito | B60H 1/00899 |
| 2019/0308489 | A1 * | 10/2019 | Spies | B60H 1/00885 |
| 2020/0070628 | A1 * | 3/2020 | Tan | B60H 1/32281 |
| 2020/0122545 | A1 | 4/2020 | Lee et al. | |
| 2020/0132204 | A1 * | 4/2020 | Krost | F16K 11/0876 |
| 2020/0362746 | A1 * | 11/2020 | Lee | B60H 1/06 |
| 2021/0086587 | A1 * | 3/2021 | Koberstein | B60H 1/00492 |
| 2021/0116153 | A1 * | 4/2021 | Dong | F25B 13/00 |
| 2021/0197648 | A1 * | 7/2021 | Shimizu | F25B 49/02 |
| 2021/0245577 | A1 * | 8/2021 | Miyakoshi | F25B 6/04 |
| 2021/0252943 | A1 * | 8/2021 | Nakagawa | B60H 1/32284 |
| 2021/0260955 | A1 * | 8/2021 | Dong | B60H 1/00921 |
| 2021/0362565 | A1 * | 11/2021 | Ishizeki | F25B 29/003 |
| 2022/0001721 | A1 * | 1/2022 | Liu | B60H 1/00664 |

FOREIGN PATENT DOCUMENTS

| | | |
|---|---|---|
| KR | 20190142008 A | 12/2019 |
| KR | 20200045727 A | 5/2020 |

* cited by examiner

HEAT PUMP SYSTEM FOR VEHICLE

CROSS-REFERENCE TO RELATED APPLICATIONS

This application claims priority to Korean Patent Application No. 10-2019-0146515, filed in the Korean Intellectual Property Office on Nov. 15, 2019, which application is hereby incorporated herein by reference.

TECHNICAL FIELD

The present invention relates to a heat pump system for a vehicle.

BACKGROUND

Generally, an air conditioner for a vehicle includes an air conditioner system for circulating a refrigerant to heat or cool an interior of the vehicle.

The air conditioner system, which can maintain a fresh indoor condition by maintaining an indoor temperature of a vehicle at an appropriate temperature regardless of an outdoor temperature change, is configured to heat or cool an interior of the vehicle by heat-exchange by an evaporator during a process in which a refrigerant discharged by driving a compressor is circulated to the compressor again by passing through a condenser, a receiver drier, an expansion valve, and the evaporator.

That is, in the air conditioner system, a high-temperature and high-pressure gaseous refrigerant compressed by the compressor is condensed through the condenser, then is evaporated by the evaporator through the receiver drier and the expansion valve to lower the indoor temperature and humidity in a summer cooling mode.

Recently, as concerns about energy efficiency and environmental pollution have gradually increased, development of an environmentally friendly vehicle capable of being substantially substituted for a vehicle having an internal combustion engine has been required, and the environmentally friendly vehicles are typically classified into an electric vehicle which is typically driven using a fuel cell or electricity as a power source, and a hybrid vehicle which is driven using an engine and an electric battery.

In the electric vehicle and the hybrid vehicle of the environmentally friendly vehicles, a separate heater is not used, unlike a general vehicle that uses an air conditioner, and an air conditioner which is applied to the environmentally friendly vehicle is typically referred to as a heat pump system.

In a case of the electric vehicle using the fuel cell, chemical reaction energy of oxygen and hydrogen is converted into electrical energy to generate driving force, and during this process, heat energy is generated by chemical reaction in the fuel cell, and as a result, effective removal of the generated heat is required to secure the performance of the fuel cell.

Even in the hybrid vehicle, the driving force is generated by driving the motor by using electricity supplied from the fuel cell or the electric battery together with the engine that is actuated with a general fuel, and as a result, the performance of the motor can be secured only by effectively removing the heat generated from the fuel cell or the battery, and the motor.

Accordingly, in a hybrid vehicle or electric vehicle of a prior art, a battery cooling system, a cooling part, and a heat pump system should be configured to have respective separate circuits to prevent heat generation of a motor, electrical equipment, and a battery including a fuel cell.

Thus, the size and weight of a cooling module disposed in the front of the vehicle are increased, and a layout of connection pipes and valves for supplying a refrigerant or coolant to the heat pump system inside an engine compartment becomes complicated.

In addition, a conventional heat pump system employs a plurality of valves for connection pipes, and thereby ride comfort may be deteriorated since noise and vibration due to frequent opening and closing operation may be transmitted to an interior of the vehicle.

In addition, a conventional heat pump system may increase in the number of parts, production cost, and weight, due to complexity of employing a plurality of valves.

The above information disclosed in this Background section is only for enhancement of understanding of the background of the invention and therefore it may contain information that does not form the prior art that is already known in this country to a person of ordinary skill in the art.

SUMMARY

An exemplary embodiment has been made in an effort to provide a heat pump system for a vehicle having advantages of utilizing an integrated control valve controlling flow of refrigerant to selectively supply the refrigerant to required constituent elements thereby simplifying a system.

In addition, an exemplary embodiment may also provide an advantage of decreasing the number of parts, production cost, and weight due to employing an integrated control valve.

An exemplary heat pump system for a vehicle includes an integrated control valve controlling a flow of a refrigerant and selectively expanding the refrigerant passing through the integrated control valve, an external condenser connected to the integrated control valve through first and second connection lines, and disposed in a front side of the vehicle, an expansion valve connected to the integrated control valve through a third connection line, an evaporator connected to the expansion valve through a refrigerant line, an accumulator connected to the evaporator through the refrigerant line, a compressor connected to the accumulator through the refrigerant line, an internal condenser connected to the compressor through the refrigerant line and connected to the integrated control valve through a fourth connection line, a first chiller disposed on a fifth connection line connecting the integrated control valve and the accumulator, a sixth connection line connecting the fifth connection line and the integrated control valve between the first chiller and the accumulator, and a second chiller provided on a seventh connection line connecting the refrigerant line and the integrated control valve between the evaporator and the accumulator.

The first chiller may be connected to the electrical component through a coolant line such that a waste heat generated at the electrical component may be recollected in a heating mode of the vehicle.

The second chiller may be connected to a battery module through a battery coolant line such that the battery module may be cooled by using a coolant that has exchanged heat with the refrigerant.

In the cooling mode of the vehicle, the first, second, third, and fourth connection lines may be opened by the operation of the integrated control valve. The fifth, sixth, and seventh connection lines may be closed by the operation of the integrated control valve. The refrigerant may circulate through the refrigerant line connected by the open first, second, third, and fourth connection lines.

In a cooling mode of the battery module, the first, second, fourth, and seventh connection lines may be opened by the operation of the integrated control valve. The third, fifth and sixth connection lines may be closed by the operation of the integrated control valve. The refrigerant may circulate through the refrigerant line connected by the open first, second, fourth, and seventh connection lines. The integrated control valve may expand a refrigerant supplied to the second chiller through the seventh connection line.

In a heating mode of the vehicle, the fourth, fifth and sixth connection line may be opened by the operation of the integrated control valve. The first, second, third, and seventh connection lines may be closed by the operation of the integrated control valve. The refrigerant may circulate through the refrigerant line connected by the open fourth, fifth and sixth connection lines. The integrated control valve may expand the refrigerant flowing to the first chiller through the fifth connection line.

The sixth connection line may supply the refrigerant stored in the external condenser to the compressor by the pressure difference formed within the integrated control valve.

In a heating/dehumidification mode of the vehicle, the first, second, third, fourth, and fifth connection lines may be opened by the operation of the integrated control valve. The sixth and seventh connection lines may be closed by the operation of the integrated control valve. The refrigerant may circulate through the refrigerant line connected by the open first, second, third, fourth, and fifth connection lines. The integrated control valve may expand the refrigerant flowing to the first chiller through the fifth connection line.

In a cooling mode of the vehicle, when a battery module is to be cooled by using the refrigerant, the integrated control valve may expand the refrigerant supplied from the external condenser through the second connection line, and exhaust the expanded refrigerant to the seventh connection line to be supplied to the second chiller.

The first and second chillers may be respectively a water-cooled heat-exchanger.

A heat pump system for a vehicle according to an exemplary embodiment employs an integrated control valve that controls flow of the refrigerant depending on driving modes of the vehicle, and by using the integrated control valve. The refrigerant may be selectively supplied to constituent elements.

In addition, a single integrated control valve may be employed, and thereby the number of employed valves may be decreased.

In addition, due to the integrated control valve, a mounting space is easily secured in a narrow engine compartment, and the required assembly labor may be reduced.

Furthermore, the entire system may be simplified, thereby reducing production costs, reducing weight, and improving space utilization.

Figure 1:
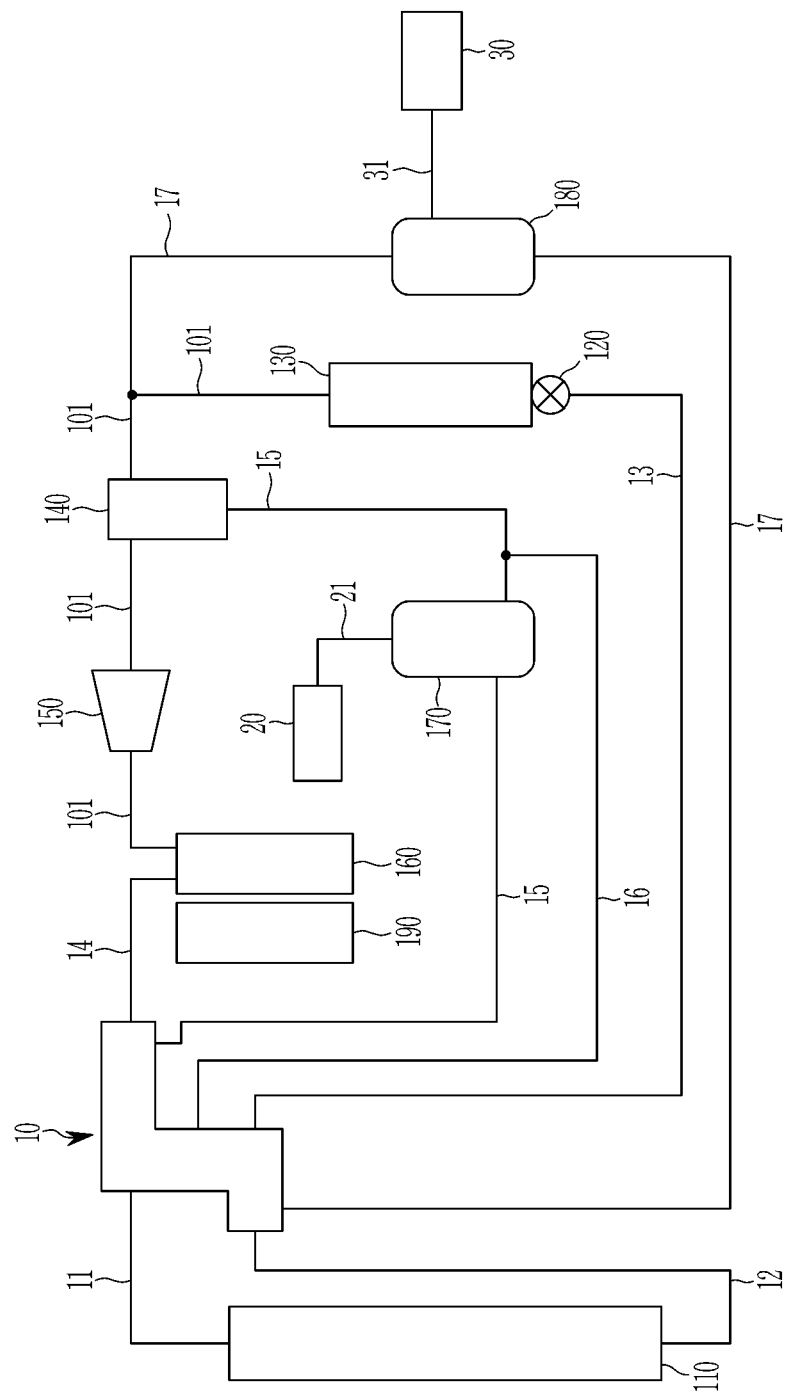
FIG. 1 is a block diagram of a heat pump system for a vehicle according to an exemplary embodiment.

The following reference numbers can be used in conjunction with the drawings:
10: integrated control valve
11, 12, 13, 14, 15, 16, 17: first, second, third, fourth, fifth, sixth, and seventh connection lines
20: electrical component
21: coolant line
30: battery module
31: battery coolant line
101: refrigerant line
110: external condenser
120: expansion valve
130: evaporator
140: accumulator
150: compressor
160: internal condenser
170, 180: first and second chillers
190: internal heater

DETAILED DESCRIPTION OF ILLUSTRATIVE EMBODIMENTS

An exemplary embodiment of the present invention will hereinafter be described in detail with reference to the accompanying drawings.

Exemplary embodiments disclosed in the present specification and the constructions depicted in the drawings are only the preferred embodiments of the present invention, and do not cover the entire scope of the present invention. Therefore, it will be understood that there may be various equivalents and variations at the time of the application of this specification.

In order to clarify the embodiments of the present invention, parts that are not connected to the description will be omitted, and the same elements or equivalents are referred to with the same reference numerals throughout the specification.

Also, the size and thickness of each element are arbitrarily shown in the drawings, but the present invention is not necessarily limited thereto, and in the drawings, the thickness of layers, films, panels, regions, etc., are exaggerated for clarity.

In addition, unless explicitly described to the contrary, the word "comprise" and variations such as "comprises" or "comprising" will be understood to imply the inclusion of stated elements but not the exclusion of any other elements.

Furthermore, each of terms, such as " . . . unit", " . . . means", " . . . part", and " . . . member" described in the specification, means a unit of a comprehensive element that performs at least one function or operation.

FIG. 1 is a block diagram of a heat pump system for a vehicle according to an exemplary embodiment.

A heat pump system 1 for a vehicle according to an exemplary embodiment may cool a battery module 30 installed in a vehicle, or may selectively utilize waste heat generated at an electrical component 20 to improve heating efficiency.

The heat pump system shown in FIG. 1 may be applied to a hybrid vehicle or an electric vehicle.

Hereinafter, the terms internal and external are used with respect to a cabin room, i.e., a driver and passenger compartment of a vehicle, which may also referred to as an interior of a vehicle. Therefore, when an element is referred to be internal, the internal element is disposed inside of the cabin room, and when an element is referred to be external, the external element is disposed outside of the cabin room.

Referring to FIG. 1, a heat pump system for a vehicle according to an exemplary embodiment may include an integrated control valve 10, an external condenser 110, an expansion valve 120, an evaporator 130, an accumulator 140, a compressor 150, an internal condenser 160, a first chiller 170, and a second chiller 180.

The integrated control valve 10 controls a flow of a refrigerant, and may selectively expand the refrigerant passing though the integrated control valve 10 to be supplied to a required constituent element among employed constituent elements.

The external condenser 110 is connected to the integrated control valve 10 through the first and second connection lines 11 and 12, and is disposed in a front side of the vehicle.

The external condenser 110 may condense a refrigerant through heat-exchange with outside air while the vehicle is being driven.

That is, the external condenser 110 receives the refrigerant from the integrated control valve 10 through a first connection line 11, and exhausts a condensed refrigerant to the integrated control valve 10 through a second connection line 12.

In the present exemplary embodiment, the expansion valve 120 is connected to the integrated control valve 10 through a third connection line 13. The expansion valve 120 may expand a refrigerant received through the third connection line 13.

The evaporator 130 is connected to the expansion valve 120 through refrigerant line 101.

The drawings illustrate that the expansion valve 120 is integrally mounted on the evaporator 130, however is not limited thereto. The expansion valve 120 and the evaporator 130 may be formed apart on the refrigerant line 101.

The accumulator 140 is connected to the evaporator 130 through the refrigerant line 101.

The compressor 150 is connected to the accumulator 140 through the refrigerant line 101. The compressor 150 compresses the refrigerant in a gas state.

Here, the accumulator 33 supplies only the refrigerant in a gas state to the compressor 150, thereby improving efficiency and durability of the compressor 150.

In the present exemplary embodiment, the internal condenser 160 is connected to the compressor 150 through the refrigerant line 101, and connected to the integrated control valve 10 through a fourth connection line 14.

Meanwhile, a temperature sensor, a pressure sensor, and the like may be provided on the refrigerant line 101 between the compressor 150 and the internal condenser 160.

Here, the internal condenser 160 and the evaporator 130 may be provided in a HVAC module (not shown) of the vehicle.

The HVAC module may be provided with an opening/closing door (not shown) that controls an ambient air having passed through the evaporator 130 to selectively flow to the internal condenser 160 and the internal heater 190 depending on cooling, heating, and heating/dehumidification modes of the vehicle.

That is, in the heating mode of the vehicle, the opening/closing door is open such that the ambient air having passed through the evaporator 130 may flow to the internal condenser 160 and the internal heater 190. In the cooling mode of the vehicle, the opening/closing door closes the internal condenser 160 and the internal heater 190 with respect to the ambient air, such that the ambient air having been cooled by passing through the evaporator 130 may directly flow into an interior, i.e., a cabin room, of the vehicle.

Here, the external condenser 110 and the internal condenser 160 may be respectively an air-cooled heat-exchanger that condenses the refrigerant by heat-exchange with an ambient air.

In the present exemplary embodiment, the first chiller 170 is disposed on a fifth connection line 15 connecting the integrated control valve 10 and the accumulator 140.

The first chiller 170 may be connected to the electrical component 20 through a coolant line 21 such that the waste heat generated at the electrical component 20 may be recollected in the heating mode of the vehicle.

Here, the electrical component 20 may include a motor, an on-board charger, an electric power control apparatus (EPCU), and the like.

The motor and the electric power control apparatus may generate heat while the vehicle is running, and the on-board charger may generate heat while the battery module 30 is recharged.

That is, the first chiller 170 may evaporate the refrigerant received through the fifth connection line 15 by heat-exchange with the coolant heated while passing through the electrical component 20, and thereby the waste heat of the electrical component 20 may be recollected.

In the present exemplary embodiment, a sixth connection line 16 may connect the fifth connection line 15 and the integrated control valve 10 between the first chiller 170 and the accumulator 140.

The sixth connection line 16 is selectively opened by the operation of the integrated control valve 10, and therefore, in the heating mode of the vehicle, the refrigerant stored in the external condenser 110 may be supplied to the compressor 150 by the pressure difference formed within the integrated control valve 10.

The second chiller 180 is provided on a seventh connection line 17 connecting the refrigerant line 101 and the integrated control valve 10 between the evaporator 130 and the accumulator 140.

Here, the second chiller 180 may be connected to the battery module 30 through a battery coolant line 31 such that the battery module 30 may be cooled by using the coolant heat-exchanged with the refrigerant.

The second chiller 180 may adjust the temperature of the coolant by selectively heat-exchanging the coolant with the coolant.

The first and second chillers 170 and 180 may respectively be a water-cooled heat-exchanger receiving the coolant.

In addition, the electrical component 20 and the battery module 30 may be cooled by a water-cooled scheme to be cooled by the coolant.

In the cooling mode of the vehicle according to the heat pump system, when the battery module 30 is to be cooled by using the refrigerant, the integrated control valve 10 expands the refrigerant supplied from the external condenser 110 through the second connection line 12 and exhausts the expanded refrigerant to the seventh connection line 17 and thereby to the second chiller 180.

The refrigerant exhausted from the external condenser 110 has a decreased temperature by being expanded at the integrated control valve 10, and flows to the second chiller 180 through the seventh connection line 17.

Then, the refrigerant in the second chiller 180 may further decrease the temperature of the coolant supplied through the battery coolant line 31.

Accordingly, the battery module 30 is supplied with the coolant that is further cooled by passing through the second chiller 180. Therefore, the battery module 30 may be cooled more efficiently.

Hereinafter, operations in respective modes of a heat pump system 1 for a vehicle according to an exemplary embodiment are described in detail with reference to FIG. 2 to FIG. 5.

Firstly, an operation in the cooling mode of the vehicle according to a heat pump system 1 for a vehicle according to an exemplary embodiment is described with reference to FIG. 2.

Figure 2:
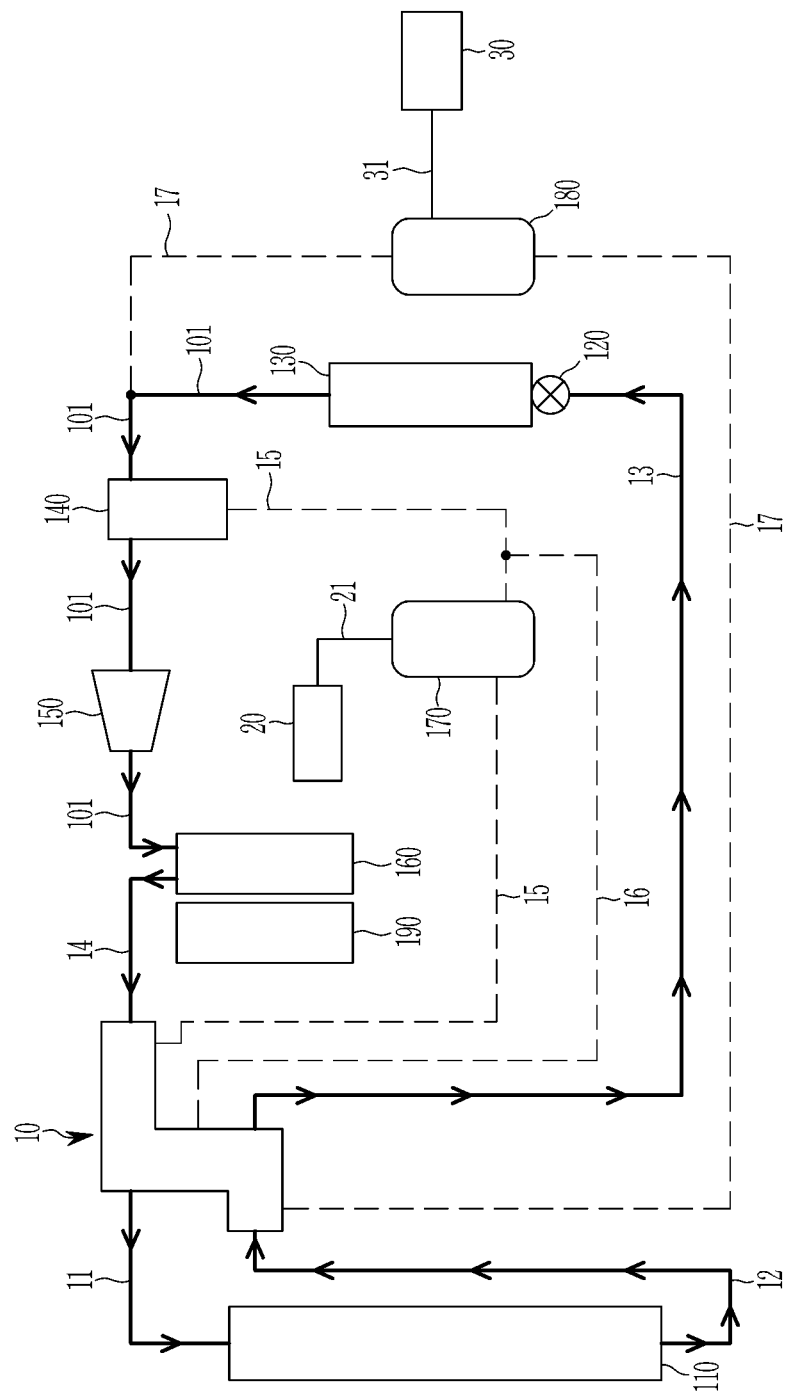
FIG. 2 illustrates an operation state of a heat pump system for a vehicle according to an exemplary embodiment according to a cooling mode of a vehicle.

FIG. 2 illustrates an operation state of a heat pump system for a vehicle according to an exemplary embodiment according to a cooling mode of a vehicle.

Referring to FIG. 2, in the cooling mode of the vehicle, the first, second, third, and fourth connection lines 11, 12, 13, and 14 are opened by the operation of the integrated control valve 10.

Simultaneously, the fifth, sixth, and seventh connection lines 15, 16, and 17 are closed by the operation of the integrated control valve 10.

Accordingly, the refrigerant may circulate through the refrigerant line 101 connected by the first, second, third, and fourth connection lines 11, 12, 13, and 14 that are open.

That is, the refrigerant compressed at the compressor 150 flows to the internal condenser 160 through the refrigerant line 101, is condensed at the internal condenser 160, and then flows to the integrated control valve 10 through the fourth connection line 14.

The integrated control valve 10 exhausts the refrigerant received from the internal condenser 160 to the external condenser 110 through the open first connection line 11. The refrigerant received at the external condenser 110 is condensed by heat-exchange with the ambient air, and flows back to the integrated control valve 10 through the second connection line 12.

Then, the refrigerant flows from the integrated control valve 10 to the expansion valve 120 through the open third connection line 13, expands at the expansion valve 120, and then flows to the evaporator 130.

Here, the ambient air flowing to the HVAC module (not shown) is cooled while passing through the evaporator 130 by the refrigerant of the lowered temperature received at the evaporator 130.

At this time, the opening/closing door closes a portion passing through the internal condenser 160 such that the cooled ambient air may not pass through the internal condenser 160 and the internal heater 190. Therefore, the cooled ambient air may directly flow into an interior, i.e., a cabin room, of the vehicle, and thereby may cool the interior of the vehicle.

The refrigerant having passed the evaporator 130 flows back to the accumulator 140 and then to the compressor 150.

That is, the refrigerant may sequentially pass through the external condenser 110, the expansion valve 120, the evaporator 130, the accumulator 140, the compressor 150, and the internal condenser 160 on the refrigerant line 101 connected by the first, second, third, and fourth connection lines 11, 12, 13, and 14 that are open by the operation of the integrated control valve 10, and thereby may cool the interior of the vehicle in the cooling mode of the vehicle.

An operation in the cooling mode of the battery module 30 in the present exemplary embodiment is described with reference to FIG. 3.

Figure 3:
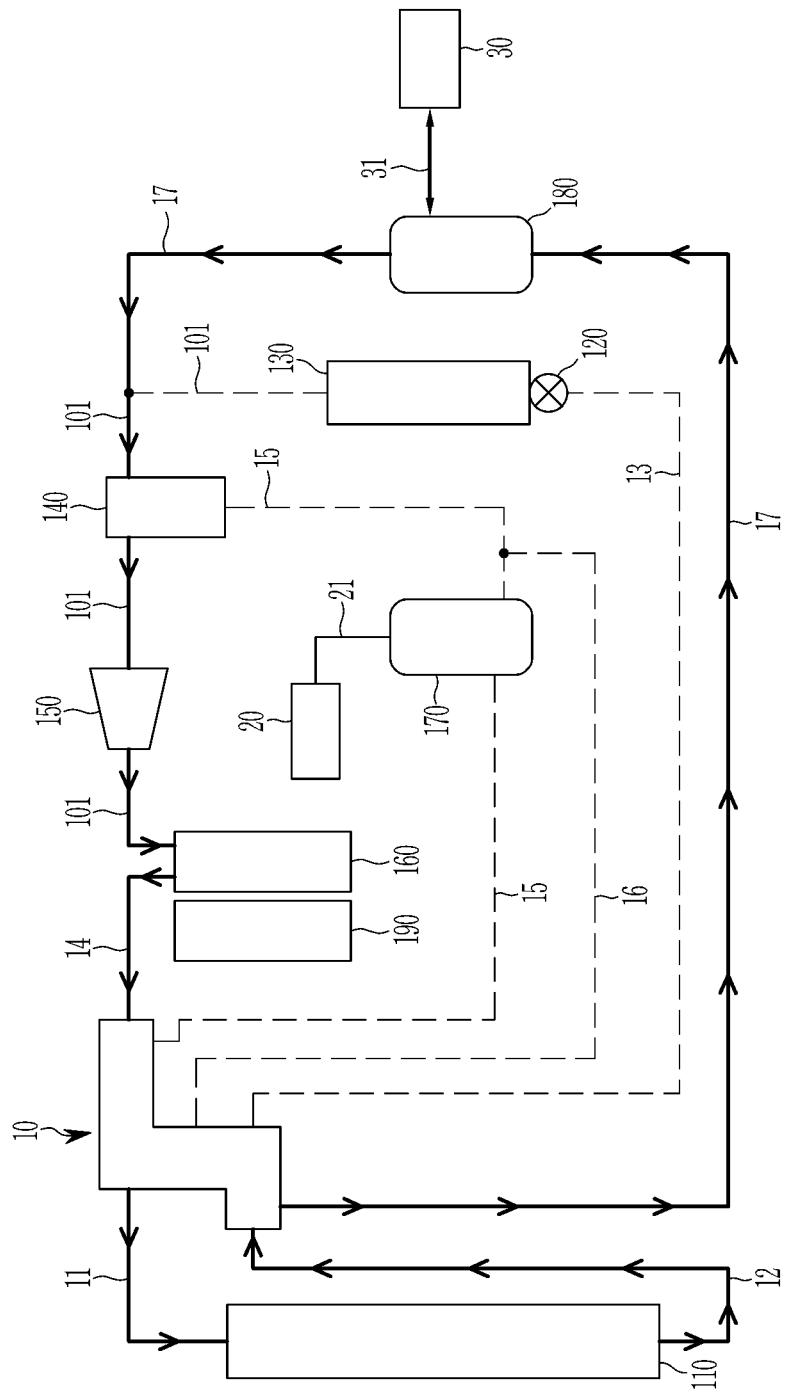
FIG. 3 illustrates an operation state of a heat pump system for a vehicle according to an exemplary embodiment according to a battery module cooling mode of a vehicle.

FIG. 3 illustrates an operation state of a heat pump system for a vehicle according to an exemplary embodiment according to a battery module cooling mode of a vehicle.

Referring to FIG. 3, in the cooling mode of the battery module 30, the first, second, fourth, and seventh connection lines 11, 12, 14, and 17 may be opened by the operation of the integrated control valve 10.

In addition, the third, fifth and sixth connection lines 13, 15, and 16 may be closed by the operation of the integrated control valve 10.

Accordingly, the refrigerant may circulate through the refrigerant line 101 connected by the open first, second, fourth, and seventh connection lines 11, 12, 14, and 17.

That is, the refrigerant compressed at the compressor 150 flows to the internal condenser 160 through the refrigerant line 101, is condensed at the internal condenser 160, and then flows to the integrated control valve 10 through the fourth connection line 14.

The integrated control valve 10 exhausts the refrigerant received from the internal condenser 160 to the external condenser 110 through the open first connection line 11. The refrigerant received at the external condenser 110 is condensed by heat-exchange with the ambient air, and flows back to the integrated control valve 10 through the second connection line 12.

Then, refrigerant is supplied from the integrated control valve 10 to the second chiller 180 through the open seventh connection line 17.

Here, the integrated control valve 10 may expand the refrigerant supplied to the second chiller 180 through the seventh connection line 17.

Accordingly, the refrigerant exhausted from the external condenser 110 has a decreased temperature by being expanded at the integrated control valve 10, and flows to the second chiller 180 through the seventh connection line 17.

Then, the refrigerant in the second chiller 180 may further decrease the temperature of the coolant supplied through the battery coolant line 31.

That is, the battery module 30 receives the coolant cooled while passing through the second chiller 180. Therefore, the battery module 30 may be cooled more efficiently.

An operation in the heating mode of the vehicle in the present exemplary embodiment is described with reference to FIG. 4.

Figure 4:
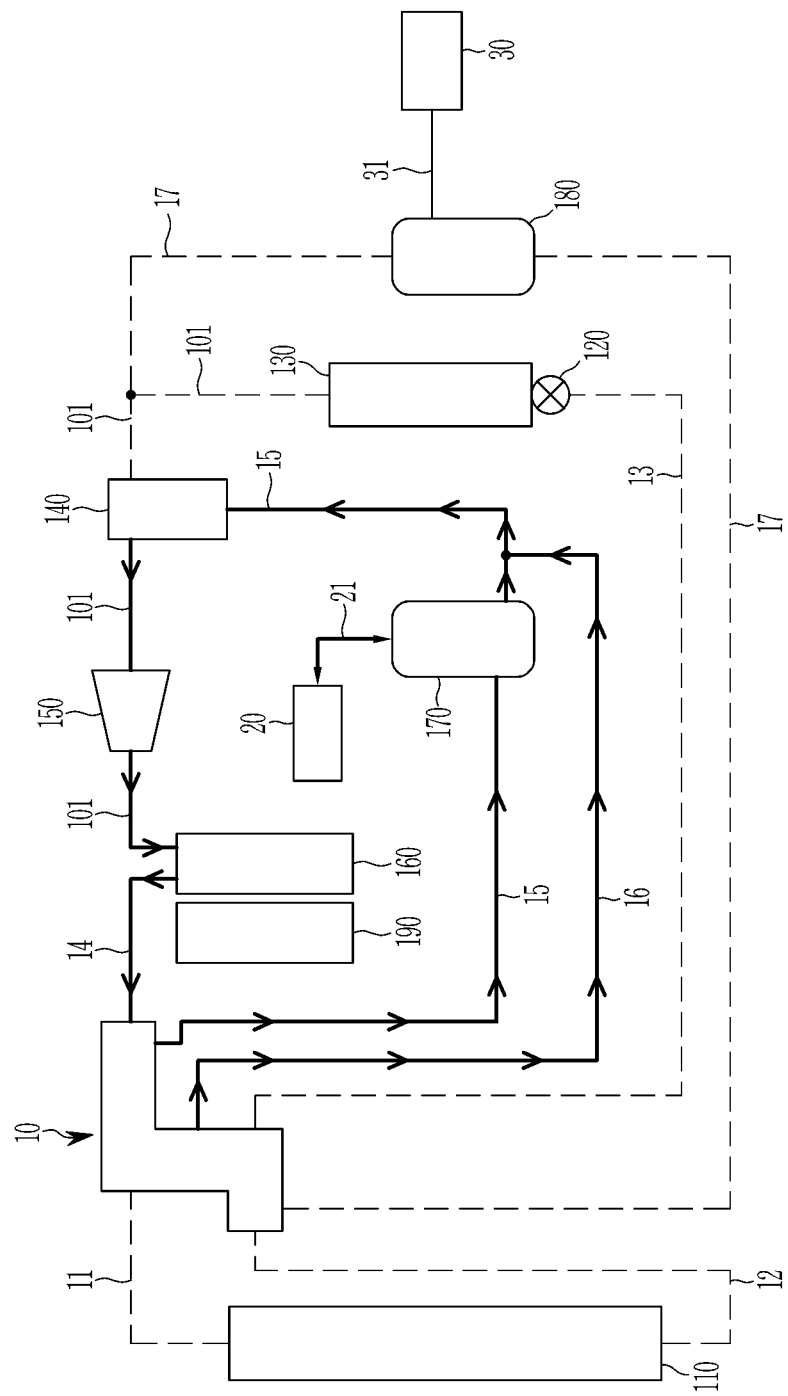
FIG. 4 illustrates an operation state of a heat pump system for a vehicle according to an exemplary embodiment according to a heating mode of a vehicle.

FIG. 4 illustrates an operation state of a heat pump system for a vehicle according to an exemplary embodiment according to a heating mode of a vehicle.

Referring to FIG. 4, in the heating mode of the vehicle, the fourth, fifth and sixth connection lines 14, 15, and 16 may be opened by the operation of the integrated control valve 10.

In addition, the first, second, third, and seventh connection lines 11, 12, 13, and 17 may be closed by the operation of the integrated control valve 10.

Accordingly, the refrigerant may circulate through the refrigerant line 101 connected by the open fourth, fifth and sixth connection lines 14, 15, and 16.

That is, the refrigerant compressed at the compressor 150 flows to the internal condenser 160 through the refrigerant line 101, primarily is condensed at the internal condenser 160, and then flows to the integrated control valve 10 through the fourth connection line 14.

The integrated control valve 10 exhausts the refrigerant received from the internal condenser 160 to the first chiller 170 through the open fifth connection line 15.

Here, the integrated control valve 10 may expand the refrigerant flowing to the first chiller 170 through the fifth connection line 15.

Therefore, the expanded refrigerant flows to the first chiller 170 through the fifth connection line 15. Here, the first chiller 170 receives the coolant heated by the waste heat of the electrical component 20 while cooling the electrical component 20.

Accordingly, refrigerant exchanges heat with the heated coolant flowing into the first chiller 170.

Then, the first chiller 170 may evaporate the expanded refrigerant received through the fifth connection line 15 by heat-exchange with the coolant heated while passing through the electrical component 20, and thereby the waste heat of the electrical component 20 may be recollected.

Meanwhile, the sixth connection line 16 may supply the refrigerant stored in the external condenser 110 to the compressor 150 by the pressure difference formed within the integrated control valve 10. Accordingly, a flow rate of the refrigerant may be increased.

That is, the waste heat generated at the electrical component 20 increases the temperature of the refrigerant at the first chiller 170.

The heated refrigerant passes through the accumulator 140 on the fifth connection line 15, and flows to the compressor 150. Then, the refrigerant is compressed to a high temperature and high pressure state at the compressor 150, and flows to the internal condenser 160.

Here, the opening/closing door is opened such that the ambient air having passed through the evaporator 130 after flowing into the HVAC module may pass through the internal condenser 160.

Accordingly, the ambient air flowing from an exterior is not cooled by passing the evaporator 130 that is not supplied with the refrigerant, and may flow into the interior of the vehicle, at room temperature. Such ambient air is heated while passing through the internal condenser 160, and flows into the interior of the vehicle by passing the internal heater 190, thereby achieving heating of the interior of the vehicle.

That is, according to a heat pump system of the present exemplary embodiment, in the heating mode of the vehicle, the waste heat of the electrical component 20 is used for increasing the temperature of the refrigerant. Therefore, power consumption of the compressor 150 may be decreased and heating efficiency may be improved.

An operation in the heating/dehumidification mode of the vehicle in the present exemplary embodiment is described with reference to FIG. 5.

Figure 5:
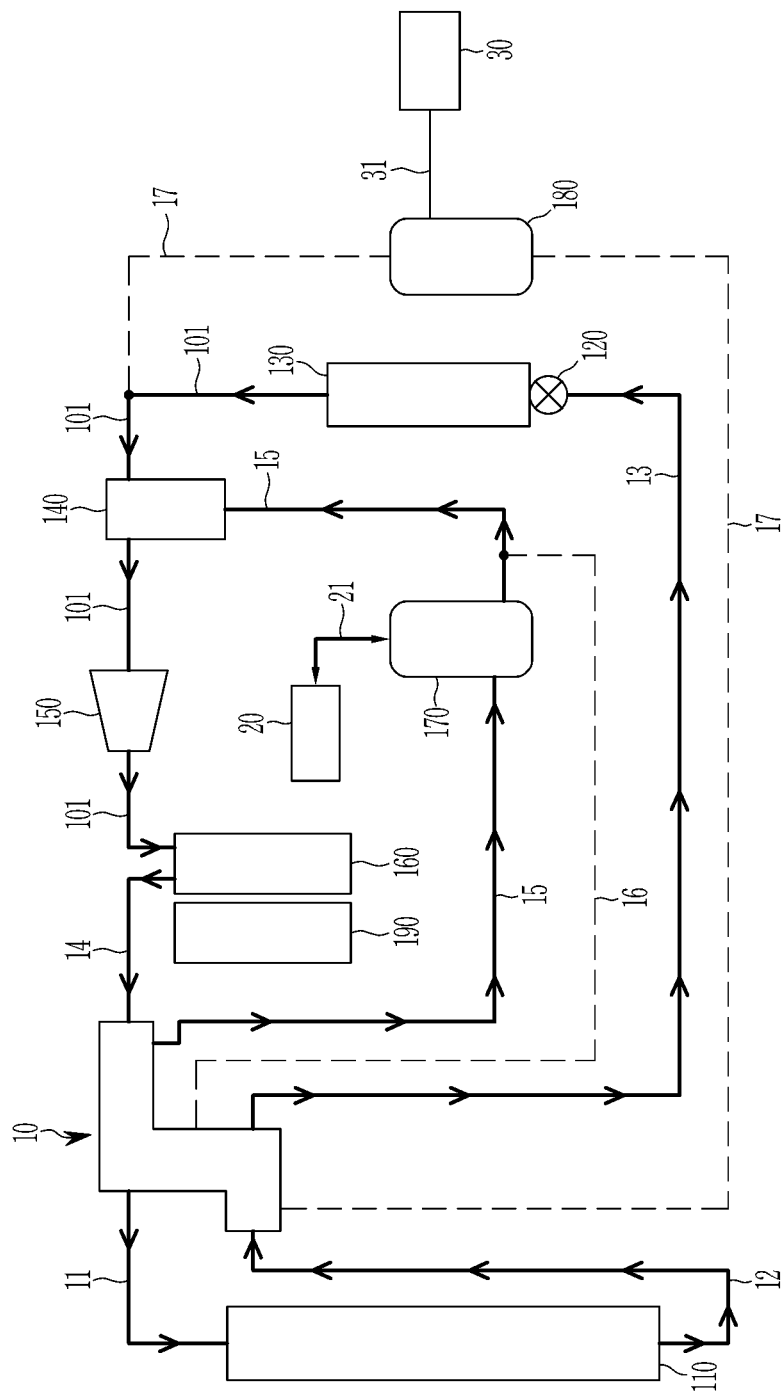
FIG. 5 illustrates an operation state of a heat pump system for a vehicle according to an exemplary embodiment according to a heating/dehumidification mode of a vehicle.

FIG. 5 illustrates an operation state of a heat pump system for a vehicle according to an exemplary embodiment according to a heating/dehumidification mode of a vehicle.

Referring to FIG. 5, in the heating/dehumidification mode of the vehicle, the first, second, third, fourth, and fifth connection lines 11, 12, 13, 14, and 15 may be opened by the operation of the integrated control valve 10.

The sixth and seventh connection lines 16 and 17 may be closed by the operation of the integrated control valve 10.

Accordingly, the refrigerant may circulate through the refrigerant line 101 connected by the open first, second, third, fourth, and fifth connection lines 11, 12, 13, 14, and 15.

That is, the refrigerant compressed at the compressor 150 flows to the internal condenser 160 through the refrigerant line 101, is condensed at the internal condenser 160, and then flows to the integrated control valve 10 through the fourth connection line 14.

The integrated control valve 10 may exhaust the refrigerant received from the internal condenser 160 to the external condenser 110 and the first chiller 170 through the open first connection line 11 and the fifth connection line 15, respectively.

That is, the integrated control valve 10 partially exhausts the refrigerant received from the internal condenser 160 to the first chiller 170 through the open fifth connection line 15.

Here, the integrated control valve 10 may expand the refrigerant flowing to the first chiller 170 through the fifth connection line 15.

Therefore, the expanded refrigerant flows to the first chiller 170 through the fifth connection line 15. Here, the first chiller 170 receives the coolant heated by the waste heat of the electrical component 20 while cooling the electrical component 20.

Accordingly, refrigerant exchanges heat with the heated coolant flowing into the first chiller 170.

Then, the first chiller 170 may evaporate the expanded refrigerant received through the fifth connection line 15 by heat-exchange with the coolant heated while passing through the electrical component 20, and thereby the waste heat of the electrical component 20 may be recollected.

That is, the waste heat generated at the electrical component 20 increases the temperature of the refrigerant at the first chiller 170.

The heated refrigerant passes through the accumulator 140 on the fifth connection line 15, and flows to the compressor 150. Then, the refrigerant is compressed to a high temperature and high pressure state at the compressor 150, and flows to the internal condenser 160.

Meanwhile, the refrigerant received at the integrated control valve 10 but not exhausted to the fifth connection line 15 is exhausted to the external condenser 110 through the open first connection line 11.

The refrigerant received at the external condenser 110 is condensed by heat-exchange with the ambient air, and flows back to the integrated control valve 10 through the second connection line 12.

Then, refrigerant flows from the integrated control valve 10 to the expansion valve 120 through the open third connection line 13, expands at the expansion valve 120, and flows to the evaporator 130.

In this state, the opening/closing door is opened such that the ambient air having passed through the evaporator 130 after flowing into the HVAC module may pass through the internal condenser 160.

Therefore, the ambient air flowing to the HVAC module is dehumidified while passing through the evaporator 130 by the low temperature refrigerant introduced to the evaporator 130. Then, the ambient air is heated while passing through the internal condenser 160, and flows into the interior of the vehicle by passing the internal heater 190, thereby achieving heating/dehumidification of the interior of the vehicle.

That is, according to a heat pump system of the present exemplary embodiment, in the heating and dehumidification mode of the vehicle, the waste heat of the electrical component 20 is used for increasing the temperature of the refrigerant. Therefore, power consumption of the compressor 150 may be decreased and heating efficiency may be improved.

A heat pump system for a vehicle according to an exemplary embodiment employs the integrated control valve 10 that controls flow of the refrigerant depending on driving modes of the vehicle, and by using the integrated control valve 10, the refrigerant may be selectively supplied to constituent elements.

In addition, a single integrated control valve may be employed, and thereby the number of employed valves may be decreased.

In addition, due to the integrated control valve 10, a mounting space is easily secured in a narrow engine compartment, and the required assembly labor may be reduced.

Furthermore, the entire system may be simplified, thereby reducing production costs, reducing weight, and improving space utilization.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A heat pump system for a vehicle, the heat pump system comprising:
    an integrated control valve configured to control a flow of a refrigerant and selectively expand the refrigerant passing through the integrated control valve;
    an external condenser connected to the integrated control valve through first and second connection lines and disposed in a front side of the vehicle;
    an expansion valve connected to the integrated control valve through a third connection line;
    an evaporator connected to the expansion valve through a refrigerant line;
    an accumulator connected to the evaporator through the refrigerant line;
    a compressor connected to the accumulator through the refrigerant line;
    an internal condenser connected to the compressor through the refrigerant line and connected to the integrated control valve through a fourth connection line;
    a first chiller disposed on a fifth connection line connecting the integrated control valve and the accumulator;
    a sixth connection line connecting the fifth connection line and the integrated control valve between the first chiller and the accumulator; and
    a second chiller provided on a seventh connection line connecting the refrigerant line and the integrated control valve between the evaporator and the accumulator;
    wherein, in a heating mode of the vehicle:
        the fourth, fifth and sixth connection lines are configured to be opened by operation of the integrated control valve;
        the first, second, third, and seventh connection lines are configured to be closed by operation of the integrated control valve;
        the refrigerant is configured to circulate through the refrigerant line connected by the open fourth, fifth and sixth connection lines; and
        the integrated control valve is configured to expand the refrigerant flowing to the first chiller through the fifth connection line.

2. The heat pump system of claim 1, wherein the first chiller is connected to an electrical component through a coolant line, and wherein the heat pump system is configured to recollect a waste heat generated at the electrical component in the heating mode of the vehicle.

3. The heat pump system of claim 1, wherein the second chiller is connected to a battery module through a battery coolant line, and wherein the battery module is configured to be cooled by using a coolant that has exchanged heat with the refrigerant.

4. The heat pump system of claim 1, wherein, in a cooling mode of the vehicle:
    the first, second, third, and fourth connection lines are configured to be opened by operation of the integrated control valve;
    the fifth, sixth, and seventh connection lines are configured to be closed by operation of the integrated control valve; and
    the refrigerant is configured to circulate through the refrigerant line connected by the open first, second, third, and fourth connection lines.

5. The heat pump system of claim 1, wherein, in a cooling mode of a battery module:
    the first, second, fourth, and seventh connection lines are configured to be opened by operation of the integrated control valve;
    the third, fifth and sixth connection lines are configured to be closed by operation of the integrated control valve;
    the refrigerant is configured to circulate through the refrigerant line connected by the open first, second, fourth, and seventh connection lines; and
    the integrated control valve is configured to expand the refrigerant supplied to the second chiller through the seventh connection line.

6. The heat pump system of claim 1, wherein the sixth connection line is configured to supply the refrigerant stored in the external condenser to the compressor by a pressure difference formed within the integrated control valve.

7. The heat pump system of claim 1, wherein, in a heating/dehumidification mode of the vehicle:
    the first, second, third, fourth, and fifth connection lines are configured to be opened by operation of the integrated control valve;
    the sixth and seventh connection lines are configured to be closed by operation of the integrated control valve;
    the refrigerant is configured to circulate through the refrigerant line connected by the open first, second, third, fourth, and fifth connection lines; and
    the integrated control valve is configured to expand the refrigerant flowing to the first chiller through the fifth connection line.

8. The heat pump system of claim 1, wherein, in a cooling mode of the vehicle, when a battery module is to be cooled by using the refrigerant, the integrated control valve is configured to expand the refrigerant supplied from the external condenser through the second connection line, and exhaust the expanded refrigerant to the seventh connection line to be supplied to the second chiller.

9. The heat pump system of claim 1, wherein the first and second chillers are respectively a water-cooled heat-exchanger.

10. A method for operating a heat pump system for a vehicle, the heat pump system comprising an integrated control valve, an external condenser disposed in a front side of the vehicle and connected to the integrated control valve through first and second connection lines, an expansion valve connected to the integrated control valve through a third connection line, an evaporator connected to the expansion valve through a refrigerant line, an accumulator connected to the evaporator through the refrigerant line, a compressor connected to the accumulator through the refrigerant line, an internal condenser connected to the compressor through the refrigerant line and connected to the integrated control valve through a fourth connection line, a first chiller disposed on a fifth connection line connecting the integrated control valve and the accumulator, a sixth connection line connecting the fifth connection line and the integrated control valve between the first chiller and the accumulator, and a second chiller provided on a seventh connection line connecting the refrigerant line and the integrated control valve between the evaporator and the accumulator, the method comprising:
- controlling a flow of a refrigerant through the heat pump system according to a mode of the vehicle;
- selectively expanding the refrigerant passing through the integrated control valve; and
- operating in a heating mode, wherein operating in the heating mode comprises:
  - opening the fourth, fifth and sixth connection lines by operation of the integrated control valve;
  - closing the first, second, third, and seventh connection lines by operation of the integrated control valve;
  - circulating the refrigerant through the refrigerant line connected by the open fourth, fifth and sixth connection lines; and
  - expanding the refrigerant flowing to the first chiller through the fifth connection line by operation of the integrated control valve.

11. The method of claim 10, wherein the first chiller is connected to an electrical component through a coolant line, the method further comprising recollecting a waste heat generated at the electrical component in the heating mode of the vehicle.

12. The method of claim 10, wherein the second chiller is connected to a battery module through a battery coolant line, the method further comprising cooling the battery module using a coolant that has exchanged heat with the refrigerant.

13. The method of claim 10, further comprising operating the vehicle in a cooling mode, wherein the cooling mode comprises:
- opening the first, second, third, and fourth connection lines by operation of the integrated control valve;
- closing the fifth, sixth, and seventh connection lines by operation of the integrated control valve; and
- circulating the refrigerant through the refrigerant line connected by the open first, second, third, and fourth connection lines.

14. The method of claim 10, further comprising operating the vehicle in a cooling mode of a battery module, wherein the cooling mode of the battery module comprises:
- opening the first, second, fourth, and seventh connection lines by operation of the integrated control valve;
- closing the third, fifth and sixth connection lines by operation of the integrated control valve;
- circulating the refrigerant through the refrigerant line connected by the open first, second, fourth, and seventh connection lines; and
- expanding the refrigerant supplied to the second chiller through the seventh connection line by operation of the integrated control valve.

15. The method of claim 10, wherein operating in the heating mode further comprises supplying the refrigerant stored in the external condenser to the compressor using the sixth connection line according to a pressure difference formed within the integrated control valve.

16. The method of claim 10, further comprising operating the vehicle in a heating/dehumidification mode, wherein the heating/dehumidification mode comprises:
- opening the first, second, third, fourth, and fifth connection lines by operation of the integrated control valve;
- closing the sixth and seventh connection lines by operation of the integrated control valve;
- circulating the refrigerant through the refrigerant line connected by the open first, second, third, fourth, and fifth connection lines; and
- expanding the refrigerant flowing to the first chiller through the fifth connection line by operation of the integrated control valve.

17. The method of claim 10, further comprising operating the vehicle in a cooling mode of the vehicle while a battery module is being cooled by using the refrigerant, wherein the cooling mode comprises:
- expanding the refrigerant supplied from the external condenser through the second connection line by operation of the integrated control valve; and
- exhausting the expanded refrigerant to the seventh connection line to be supplied to the second chiller.

18. The method of claim 10, wherein the first and second chillers are respectively a water-cooled heat-exchanger.

19. A vehicle comprising:
- an electrical component;
- a coolant line connected to the electrical component;
- a battery module;
- a battery coolant line connected to the battery module; and
- a heat pump system comprising:
  - an integrated control valve configured to control a flow of a refrigerant and selectively expand the refrigerant passing through the integrated control valve;
  - an external condenser connected to the integrated control valve through first and second connection lines and disposed in a front side of the vehicle;
  - an expansion valve connected to the integrated control valve through a third connection line;
  - an evaporator connected to the expansion valve through a refrigerant line;
  - an accumulator connected to the evaporator through the refrigerant line;
  - a compressor connected to the accumulator through the refrigerant line;
  - an internal condenser connected to the compressor through the refrigerant line and connected to the integrated control valve through a fourth connection line;
  - a first chiller disposed on a fifth connection line connecting the integrated control valve and the accumulator, wherein the first chiller is connected to the electrical component through the coolant line and wherein the heat pump system is configured to recollect a waste heat generated at the electrical component in a heating mode of the vehicle;
  - a sixth connection line connecting the fifth connection line and the integrated control valve between the first chiller and the accumulator; and
  - a second chiller provided on a seventh connection line connecting the refrigerant line and the integrated control valve between the evaporator and the accumulator, wherein the second chiller is connected to the battery module through the battery coolant line and wherein the battery module is configured to be cooled by using a coolant that has exchanged heat with the refrigerant;
  - wherein in the heating mode of the vehicle:
    - the fourth, fifth and sixth connection lines are configured to be opened by operation of the integrated control valve;

the first, second, third, and seventh connection lines are configured to be closed by operation of the integrated control valve;

the refrigerant is configured to circulate through the refrigerant line connected by the open fourth, fifth and sixth connection lines; and the integrated control valve is configured to expand the refrigerant flowing to the first chiller through the fifth connection line.

20. The vehicle of claim 19, wherein the first and second chillers are respectively a water-cooled heat-exchanger.

* * * * *